(12) United States Patent
Egal et al.

(10) Patent No.: US 11,072,274 B2
(45) Date of Patent: Jul. 27, 2021

(54) PIXELATED LIGHT MODULE FOR A MOTOR VEHICLE AND LIGHTING AND/OR SIGNALLING DEVICE PROVIDED WITH SUCH A MODULE

(71) Applicant: Valeo Vision, Bobigny (FR)

(72) Inventors: Fabrice Egal, Bobigny (FR); Julien Rizzi, Bobigny (FR); David Ruiz-Aranzaes, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 16/129,203

(22) Filed: Sep. 12, 2018

(65) Prior Publication Data

US 2019/0077300 A1 Mar. 14, 2019

(30) Foreign Application Priority Data

Sep. 12, 2017 (FR) ...................................... 1758414

(51) Int. Cl.
*B60Q 1/00* (2006.01)
*F21S 41/32* (2018.01)
(Continued)

(52) U.S. Cl.
CPC .......... *B60Q 1/0047* (2013.01); *B60Q 1/085* (2013.01); *F21S 41/143* (2018.01); *F21S 41/285* (2018.01);
(Continued)

(58) Field of Classification Search
CPC . G02B 19/0028; G02B 26/0833; F21V 13/04; B60Q 2400/50; F21W 2103/60
See application file for complete search history.

(56) References Cited

U.S. PATENT DOCUMENTS

2007/0092189 A1* 4/2007 Morejon ............ G02B 26/0833
385/120
2010/0110695 A1* 5/2010 Nakamura ......... G02B 19/0061
362/311.09
(Continued)

FOREIGN PATENT DOCUMENTS

CN 103672747 A 3/2014
CN 106969311 A 7/2017
(Continued)

OTHER PUBLICATIONS

French Preliminary Search Report dated May 14, 2018, in French Application 1758414 filed Sep. 12, 2017 (with English Translation of Categories of Cited Documents).
(Continued)

*Primary Examiner* — Rajarshi Chakraborty
*Assistant Examiner* — Michael Chiang
(74) *Attorney, Agent, or Firm* — Oblon, McClelland, Maier & Neustadt, L.L.P.

(57) ABSTRACT

A light module for a motor vehicle configured to produce an output beam, including a light source, a pixelated and digital imaging system, and an optical device that is interposed between the light source and the pixelated and digital imaging system so as to transmit at least part of the light rays originating from the light source to an impact surface of the pixelated and digital imaging surface. The optical device includes a first portion configured to process a first part of the light rays originating from the light source and a second portion configured to process a second part of the light rays originating from the light source. The first portion is configured to produce a first output beam having a first distribution of light on the impact surface and the second portion is configured to produce a second output beam having a second distribution of light on the impact surface.

21 Claims, 4 Drawing Sheets

(51) Int. Cl.
    *F21S 41/20*     (2018.01)
    *F21S 41/675*     (2018.01)
    *F21S 41/365*     (2018.01)
    *F21S 41/143*     (2018.01)
    *F21S 41/64*     (2018.01)
    *B60Q 1/08*     (2006.01)
    *F21S 41/265*     (2018.01)

(52) U.S. Cl.
    CPC ........... *F21S 41/322* (2018.01); *F21S 41/365* (2018.01); *F21S 41/645* (2018.01); *F21S 41/675* (2018.01); *B60Q 2400/50* (2013.01); *F21S 41/265* (2018.01)

(56) References Cited

U.S. PATENT DOCUMENTS

| | | | |
|---|---|---|---|
| 2014/0071704 | A1 | 3/2014 | Yagi |
| 2015/0377442 | A1* | 12/2015 | Bhakta .................... F21S 41/25 362/510 |
| 2015/0377446 | A1* | 12/2015 | Bhakta .................... F21S 41/16 362/510 |
| 2016/0347237 | A1* | 12/2016 | Bhakta .................. F21S 41/285 |
| 2017/0144589 | A1 | 5/2017 | Jung et al. |
| 2018/0031202 | A1* | 2/2018 | Bhakta .................... F21S 41/25 |
| 2018/0118095 | A1* | 5/2018 | Kunii .................. G01C 21/365 |
| 2018/0238512 | A1* | 8/2018 | Courcier ................ B60Q 1/085 |
| 2018/0335191 | A1* | 11/2018 | Stefanov ............... F21S 41/635 |

FOREIGN PATENT DOCUMENTS

| | | |
|---|---|---|
| DE | 10 2016 103717 A1 | 9/2017 |
| EP | 2 708 801 A2 | 3/2014 |
| EP | 2 772 682 A2 | 9/2014 |

OTHER PUBLICATIONS

Office Action dated Jul. 27, 2020 in Chinese Patent Application No. 201811066703.9, with concise English translation.

\* cited by examiner

PIXELATED LIGHT MODULE FOR A MOTOR VEHICLE AND LIGHTING AND/OR SIGNALLING DEVICE PROVIDED WITH SUCH A MODULE

The present invention particularly relates to a light module for a motor vehicle and to a lighting and/or signalling device provided with such a module.

A preferred application relates to the motor vehicle industry, for vehicle equipment, in particular for the production of devices capable of emitting light beams, also called lighting and/or signalling functions, generally meeting regulations. For example, the invention can allow a light beam, preferably high-resolution, of the pixelated type to be produced, particularly for signalling and/or for participating in lighting functions at the front of a vehicle. It can be used to display pictograms in the vicinity of a projection surface of the exiting light.

BACKGROUND

The signalling and/or lighting lamps of motor vehicles are light devices that comprise one or more light sources and an outer lens that encloses the lamp. In a simplified manner, the light source emits light rays in order to form a light beam that is directed towards the outer lens so as to produce an illuminating surface that transmits the light outside the vehicle. These functions must meet regulations in terms of light intensity and angles of visibility in particular. The known lighting and signalling modules to date are designed to emit, for example:
- a low beam, directed downwards, that is sometimes still called dipped-beam and is used in the event of the presence of other vehicles on the carriageway;
- a high beam devoid of cut-off and characterised by maximum illumination in the axis of the vehicle;
- a fog light beam, characterised by a flat cut-off and a significant breadth of illumination;
- a signalling beam for urban circulation, also called town light.

These conventional functions in some instances have recently evolved into more complex functions such as, for example, anti-glare high beam or beams that adapt according to the rotation of the steering wheel of the vehicle.

The low beam must enable both lighting quality and the absence, or the reduction, of the hindrance caused by the luminous flux produced for the surrounding vehicles. Currently, low beams are basically defined to this end with, in particular, recourse to cut-offs, particularly with a bent portion, called "kink", at the top of the beam, so as to precisely limit or avoid illumination above the line of horizon and to best design a light projection zone to be prohibited since it is likely to hinder the driver of an oncoming vehicle.

Recently, headlamps have been developed that allow functions for displaying pictograms, which are very useful for indicating information intended for the driver, for example. It is thus possible, for the sake of illustration, for an arrow to be displayed on the carriageway of the route taken so as to highlight information relating to cornering or a preferable change of direction. Clearly, the shape of the pictograms is not limited by the invention.

A device for projecting a light beam in front of a vehicle is known from patent document US A1 2008/0198372 that comprises a pixelated and digital imaging system based on a matrix of micro-mirrors. Even though it allows patterns to be projected, particularly pictograms, this technique of emitting pixelated beams does not satisfactorily integrate in relation to the regulatory lighting functions.

SUMMARY

The aim of the present invention is to overcome at least part of the disadvantages of current techniques.

The present invention relates to, according to one aspect, a light module for a motor vehicle configured to produce an output beam, comprising a light source, a pixelated and digital imaging system, and an optical device that is interposed, following the path of the light rays originating from the light source, between the light source and the pixelated and digital imaging system so as to transmit at least part of the light rays originating from the light source to an impact surface of the pixelated and digital imaging surface. Advantageously, the optical device comprises a first portion configured to optically process a first part of the light rays originating from the light source and a second portion configured to optically process a second part, different from the first part, of the light rays originating from the light source, and the first portion is configured to produce a first output beam having a first spatial distribution of light on the impact surface. The second portion is configured to produce a second output beam having a second spatial distribution of light, different from the first distribution, on the impact surface.

Thus, a single source, intended for a pixelated system and particularly for a matrix of micro-mirrors, can be used to differentiate the illumination to the impact surface on the pixelated system. The light concentration can, at the output of the module, be different according to the zones of the space. For example, a greater light concentration advantageously is produced in a restricted zone of the face of the pixelated system to produce, at the output of the module, more intense illumination in a zone of the projected beam that is located towards the optical axis, whilst maintaining good homogeneity of light concentration elsewhere, particularly on a peripheral portion.

According to another aspect, the present invention also relates to a lighting and/or signalling device for a motor vehicle equipped with at least one light module.

This device can comprise at least one additional module comprising at least one from among an additional module configured to produce a low beam base beam and an additional module configured to produce a high beam base beam.

Thus, the pixelated beam can be an effective supplement for one, or even a plurality of, other beam(s). In particular, in a preferred case, the device comprises an additional module configured to produce a low beam base beam and an additional module configured to produce a high beam base beam and wherein the output beam of the module partly overlaps both the high beam base beam and the low beam base beam.

The present invention also relates to a vehicle equipped with at least one module and/or one device according to the present invention.

According to a particularly advantageous embodiment, the first spatial distribution has a homogeneous light intensity in a closed contour zone centred on the impact surface and covering at least 50% of the impact surface. This distribution is particularly well adapted for supplementing a low beam.

Optionally, the second spatial distribution has an increasing light intensity up to a zone of maximum light concentration. This can allow a maximum illumination point to be created. Preferably, the light intensity in the zone of maximum light concentration is greater than the maximum light intensity of the first spatial distribution; the highest possible maximum light level is thus created.

Optionally, the zone of maximum light concentration includes the centre of the impact surface.

According to one embodiment, the second portion of the optical device is configured to reflect light rays towards an output dioptre. A first optical process is thus performed. This optical mode is reflective.

Advantageously, the first portion of the optical device is configured to transmit light rays towards an output dioptre. The optical processing therefore preferably does not include reflection and can be different from that of the first portion. This optical mode is refractive.

In one embodiment, the optical device comprises an optical block comprising a first face forming an input dioptre for rays originating from the light source and provided with a cavity comprising a bottom and a lateral wall and a second face, opposite the first face, forming an output dioptre for light rays, the block being configured to reflect at least part of the rays entering the block via the lateral wall towards the second face and to transmit at least part of the rays entering the block via the bottom towards the second face.

This enables differentiation of the two distributions in a structurally simple manner.

Optionally, the block is configured to reflect at least part of the rays entering the block via the lateral wall towards the second face by total internal reflection.

Alternatively, the block is configured to reflect at least part of the rays entering the block via the lateral wall towards the second face by reflecting on a reflective surface of the external wall of the block. A reflective surface therefore does not need to be provided.

Possibly, the optical block is an integrally formed single part.

In a particular case, the optical device comprises an optical block comprising an input dioptre for the rays originating from the light source and at least one additional optical element separated from the optical block. This can allow the optical functions performed by various parts of the optical device to be differentiated.

According to a non-limiting case, the optical block is configured to collimate at least part of the rays upon exiting and the additional optical element is configured to concentrate the collimated rays.

Preferably, the pixelated and digital imaging system comprises a matrix of micro-mirrors.

Advantageously, the light source comprises a rectangular shaped light emission face, preferably provided with at least one light-emitting diode. This preferably allows adaptation, upon emission of light, to the shape of the impact surface of the pixelated imaging system.

For example, the light emission face is a homothety of the impact surface. Alternatively, the first portion and the second portion are configured to produce an anamorphosis between the emission face and the impact surface.

The output beam can be configured to project at least one pictogram pattern.

BRIEF DESCRIPTION OF THE DRAWINGS

Further features and advantages of the present invention will be better understood by means of the exemplary description and the drawings, in which.

DETAILED DESCRIPTION

Unless specifically stated otherwise, technical features described in detail for a given embodiment can be combined with technical features described within the context of other embodiments described by way of a non-limiting example.

In the features described hereafter, the terms relating to verticality, horizontality and transversality, or their equivalents, are understood in relation to the position in which the lighting module is intended to be mounted in a vehicle. The terms "vertical" and "horizontal" are used throughout the present description to denote directions, along an orientation perpendicular to the plane of the horizon for the term "vertical", and along an orientation parallel to the plane of the horizon for the term "horizontal". They are to be considered in the operating conditions of the device in a vehicle. The use of these words does not mean that slight variations around the vertical and horizontal directions are excluded from the invention. For example, an incline relative to these directions of approximately + or −10° is considered herein to be a minor variation around the two prioritised directions.

The device of the invention at the very least incorporates a module allowing a beam of the pixelated type to be generated, but also preferably enables the projection of at least one other beam, by means of at least one other module. Therefore, the device of the invention can be complex and associate a plurality of modules that also optionally can share components.

Figure 1:
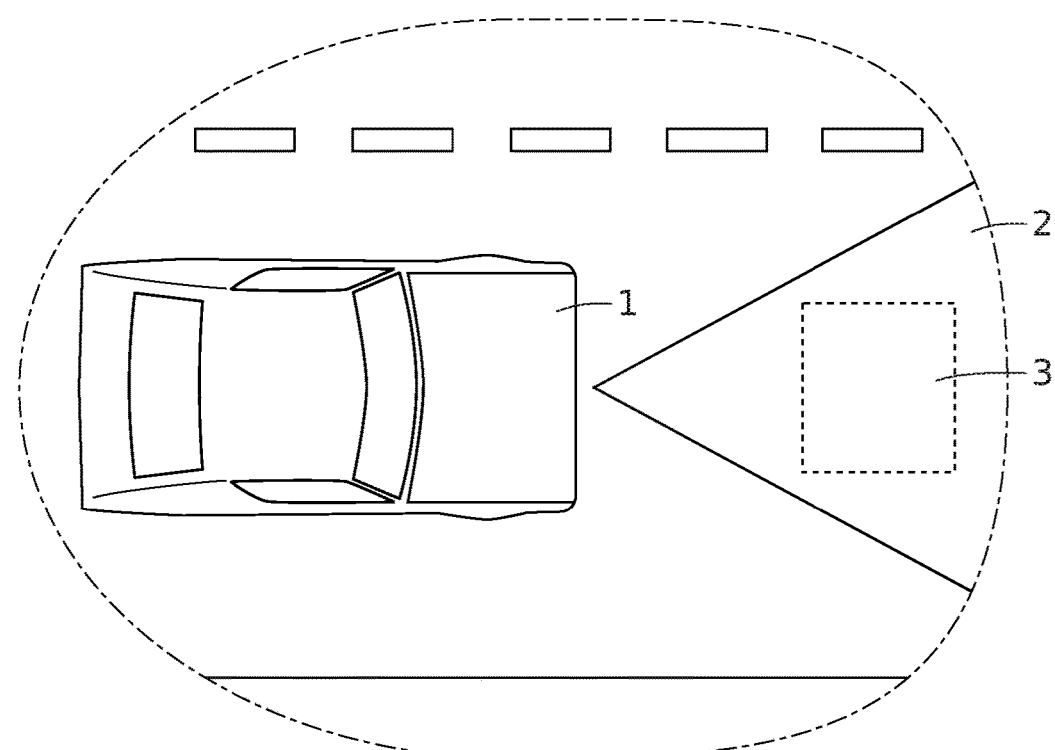
FIG. 1 shows a diagram of a projection of a beam in front of a vehicle with a zone for projecting pictograms.

FIG. 1 shows a vehicle 1, in front of which a beam, for example, a low beam (or even a high beam), is projected. FIG. 1 also shows the possibility, in a zone 3, of producing the emission of a pixelated beam. This is particularly advantageous for generating pictogram patterns. A single pictogram can be projected. A plurality of pictograms also can be simultaneously or alternatively displayed. In the example shown, the simultaneous projection of a base beam 2 and of the pixelated beam 3 allows a low beam to be produced.

Within the scope of the invention, a low beam is understood to be a beam used in the presence of oncoming and/or followed vehicles and/or other elements (individuals, obstacles, etc.) on or in the vicinity of the carriageway. This beam has an average downwards direction. It optionally can be characterised by a lack of light above a plane inclined by 1% downwards on the side of the circulation in the other direction and by another plane inclined by 15° in relation to the preceding plane on the side of the circulation in the same direction, with these two planes defining a cut-off according to European regulations. The purpose of this upper downwards cut-off is to avoid glaring the other users present in the road scene extending in front of the vehicle or on the verges of the road. The low beam, that previously originated from a single headlamp, has undergone evolutions, the low beam function being able to be coupled with other lighting features that are still considered to be low beam functions within the meaning of the present invention. This particularly comprises the following functions:

- AFS ("Advanced Front Lighting System") beam, which particularly offers other types of beams. It particularly involves the function called BL (Bending Light) for bend lighting, which can be broken down into a function called DBL (Dynamic Bending Light) for movable bend lighting and a function called FBL (Fixed Bending Light) for fixed bend lighting;
- Town Light beam for town lighting. This function widens a low beam type beam, while slightly reducing its range;
- Motorway Light beam for motorway lighting, which implements the motorway function. This function provides an increase in the range of a low beam by concentrating the luminous flux of the low beam in the vicinity of the optical axis of the considered headlamp device;
- Overhead Light beam for overhead lighting. This function modifies a typical low beam beam so that overhead signs located above the road are satisfactorily illuminated by means of the low beam;
- AWL beam (Adverse Weather Light) for adverse weather lighting.

The purpose of the base high beam is to illuminate a wide range of the scene in front of the vehicle, but also over a significant distance, typically approximately 200 metres. This light beam, due to its lighting function, is mainly located above the line of horizon. It can have a slightly ascending optical lighting axis, for example.

The device also can fulfil other lighting functions via or apart from those previously described.

As previously indicated, an aspect of the invention relates to a module allowing the generation of an output beam of the pixelated type, i.e. processed by a pixelated and digital imaging system providing significant flexibility, by controlling the imaging system, in terms of configurations of effectively projected beams. The term "pixelated and digital imaging system", "pixelated ray imaging system" or their equivalents define a system emitting a light beam, said light beam being formed by a plurality of sub-light beams, each sub-light beam being able to be controlled independently of the other sub-light beams. These systems can be, for example, matrices of micro-mirrors, liquid crystal devices, Digital Light Processing (DLP) technology. The matrices of micro-mirrors are also called "Digital Micro-mirror Device" (DMD). Each independently controllable sub-beam forms a pixelated ray. The control of the matrices of micro-mirrors is performed by control electronics. Each micro-mirror preferably has two operating positions. One position, called active position, corresponds to an orientation of the micro-mirrors that allows reflection of an incident light beam towards an output dioptre. One position, called passive position, corresponds to an orientation of the micro-mirrors that allows reflection of an incident light beam towards an absorbent surface, i.e. in a different direction to that of the output dioptre. In general, this type of imaging system is implemented in microelectromechanical systems known as MEMS.

In a manner per se known, a light source is used to illuminate an impact surface of the pixelated imaging system, for example, the reflective face of the micro-mirrors of a matrix of micro-mirrors, and the rays processed by the pixelated imaging system are returned in order to be projected, generally by means of an optical output element, such as an outer lens of a headlamp or a projection lens. In general, the present invention particularly can use light sources of the light-emitting diodes type, also commonly called LEDs. In particular, these LEDs can be provided with at least one chip capable of emitting light with intensity that advantageously can be adjusted according to the lighting and/or signalling function to be performed. Furthermore, the term light source is understood herein to be an assembly of at least one elementary source, such as an LED, capable of producing a flux resulting in the generation, at the output of the module of the invention, of at least one light beam. In an advantageous embodiment, the output face of the source has a rectangular section, which is typical for LED chips.

The full benefit of pixelated beams in the motor vehicle field and the demultiplication of the functionalities that they allow is understood. However, their integration in vehicles concomitantly with the systems for projecting other beams remains largely unexplored.

Figure 2:
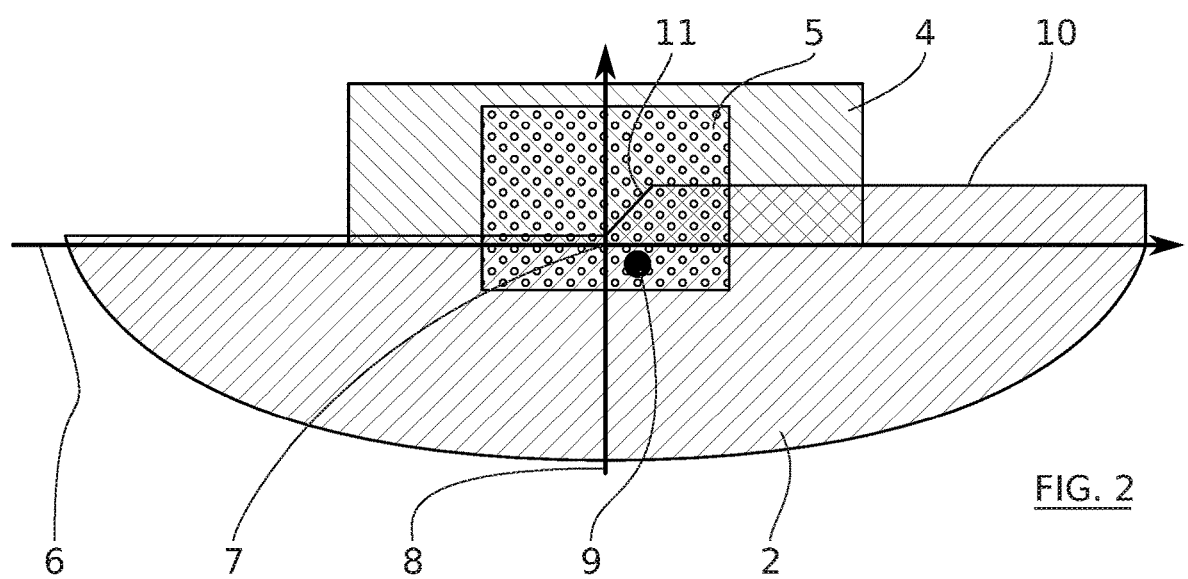
FIG. 2 shows an example of the distribution of the projection of various beams in front of a vehicle on an imaginary vertical screen placed perpendicular to the optical axis.

FIG. 2 shows an example according to the invention of the association of a pixelated output beam 5 with a low beam base beam 2 and a high beam base beam 4. FIG. 2 shows that the low beam typically comprises a cut-off edge 10 at its upper limit, this edge also being able to comprise a kinked part 11 intended to differentiate two parts of the low beam around a vertical plane passing through the optical axis 7 and comprising the line 8 shown in FIG. 2. On one side of the vertical plane, the projection is lower so as to be less glaring for oncoming vehicles. It is to be noted that the low beam appears relatively spread along the line of horizon 6, which corresponds to a desire for lighting with homogenous light intensity in this direction for this type of function. The high beam base beam 4 shown in FIG. 2 for its part is generally located above the line of horizon 6 and is much more concentrated around the optical axis 7, which expresses the desire for long-range lighting for this type of function.

Thus, the low beam requires a homogenous and predominantly wide beam 10 located below the line of horizon 6, whereas the high beam requires a high illumination and less laterally spread beam.

FIG. 2 also shows the location of a light concentration zone 9 corresponding to the location where the maximum illumination of the full beam (including the low beam and the high beam) is produced. In general, the intention is for this maximum to be located below the line of horizon or thereon (but not higher) and/or preferably on the optical axis or on the side thereof comprising the kinked portion 11. By considering that FIG. 2 defines an orthogonal reference frame formed by the line of horizon 6 and the vertical line 8, the maximum 9 is located in the second quadrant. It also can be found on the optical axis 7. According to one possibility, this maximum can be on the vertical line 8 or included in a range of −0.5° to +0.5° around this line 8.

A separable aspect of the present invention, shown in FIG. 2, is that of producing an output beam 5 that simultaneously overlaps the low beam base beams 2 and the high beam base beams 4. For example, the output beam 5 thus can be used to project pictograms, at least partly in the overlapping zone with the base beam 2. It also can be used to supplement the high beam, with a projection overlapping the beam 4. Thus, advantageously, the beam 5 is projected in a zone integrating the optical axis 7, with this zone also being able to be vertically symmetrical around the optical axis; the beam 5 also for one part is located below the line of horizon 6 and for another part is located above the line of horizon. The invention thus allows, with a single pixelated imaging system that produces a pixelated output beam 5, both anti-glare and dynamic bend light functionalities to be produced in the high beam base part 4 and allows ground writing to be provided with projection of pictograms in the low beam base part 2. In this type of twin configuration (where the output beam straddles the line of horizon), the proportion of output beam 5 above the line of horizon is greater than 50%, preferably between 60% and 70%, so that the output beam 5 advantageously covers a vertical field extending between −3° to −2° for its lower limit and +6° for its upper limit.

Furthermore, the combination of beams 2, 4 and 5 advantageously allows a zone 9 of maximum light concentration to be defined.

In order to implement such an integration of the pixelated beam in combination with the other beams, the present invention proposes integrating, in the module for generating said beam, an optical device allowing processing of the light originating from the light source in order to distribute the illumination of the impact surface of the pixelated imaging system in a differentiated manner, in order to produce an output beam 5 having optimal illumination distribution, particularly in combination with other beams performing lighting and/or signalling functions.

Figure 3:
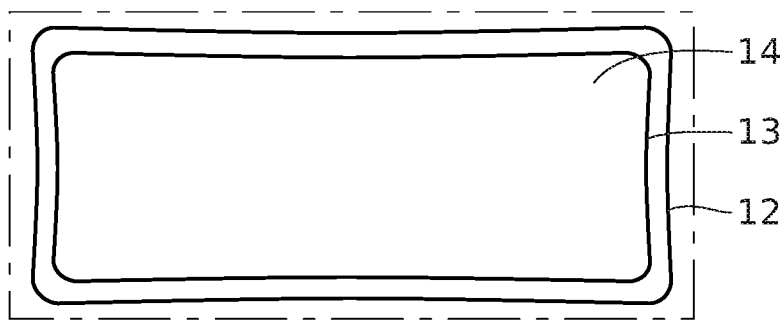
FIG. 3 shows a light distribution that is possible by virtue of the invention.

FIG. 3 provides an example of the first distribution of light that can be used for the pixelated beam in a plane corresponding to the impact surface of light rays on the pixelated and digital imaging system. The distribution of the illumination is such that the light intensity is substantially constant in a very wide zone at the centre of the illuminated region, corresponding to the zone 14. Preferably, the shape and dimensions of the zone 14 correspond to those of the impact surface of the imaging system. This generally has a substantially rectangular periphery, as shown in FIG. 3. In one embodiment of the invention, the whole illuminated region is formed by the zone 14, so that the light intensity is identical throughout the projection zone. However, in practice, a light intensity gradient generally will be observed in the direction of the boundary of the illuminated region. This is shown with a line corresponding to an illumination variation zone 13 between the zone 14 and the contour 12 of the illuminated region. Preferably, the zone 13 also has a substantially rectangular shape.

Solely by way of an example, the light intensity level generated in the zone 14 can be greater than $2.10^7$ lux and/or less than $4.10^7$ lux.

Figure 4:
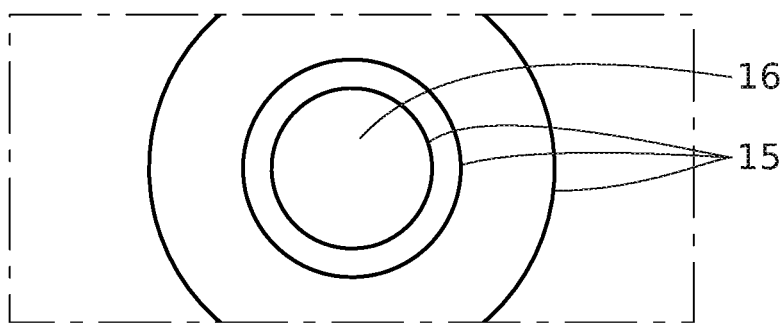
FIG. 4 shows another light distribution that can be produced by virtue of the invention.

FIG. 4 provides an example of a second distribution of light on the impact surface of the imaging system. In this situation, unlike in FIG. 3, an increase in the light intensity is sought in the direction of a zone 16 of maximum light concentration. This can be placed at the centre of the illuminated region, but this is not limiting, particularly if the intention is to obtain a zone 9 of light concentration on the projection in front of the vehicle that is not located in the vicinity of the optical axis 7, i.e. according to the example shown in FIG. 2. With the distribution of FIG. 4, a projection in front of the vehicle would be obtained instead such that the maximum light intensity 9 is located in the vicinity of the optical axis 7 insofar as the zone 16 is centred on the impact surface of the pixelated and digital imaging system. This can be modified, particularly if the module is pivoting. FIG. 4 shows a progressive increase in the light intensity towards the centre of the surface illuminated with illumination variation zones 15. These correspond to concentric lines around the zone 16. Solely by way of an example, the light intensity level generated in the zone 16 can be greater than $10^8$ lux.

Figure 5:
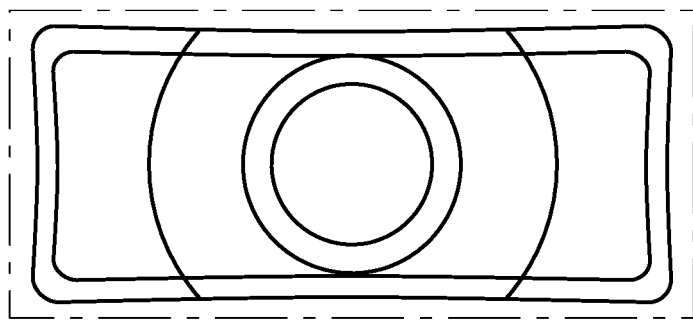
FIG. 5 shows the combination originating from the light distributions of FIGS. 3 and 4.

As previously indicated, a separable aspect of the invention is the formation of a pixelated beam associating differentiated distributions of light. To this end, a preferred embodiment of the invention corresponds to associating the distributions of light shown in FIGS. 3 and 4. It is this association that is shown in FIG. 5. FIG. 5 basically corresponds to the superposition of the light projections of the previous two figures. A wide peripheral zone is thus obtained of the projection, in which the light intensity is homogeneous, as defined by the zone 14. However, a portion, in this case a central portion, of the light is more intense, as defined by the zone 16.

Therefore, an aim of the invention is to produce a plurality of different light distributions, advantageously two, from a single light source, to be applied on the active surface of a pixelated and digital imaging system and, downstream, to create a pixelated beam having a complex spatial distribution. In order to achieve this, the invention uses an optical device capable of converting the distribution of the light rays originating from the light source in a differential manner in accordance with the regions of the space, and particularly in accordance with the point of impact on the impact surface of the imaging system.

Figure 6:
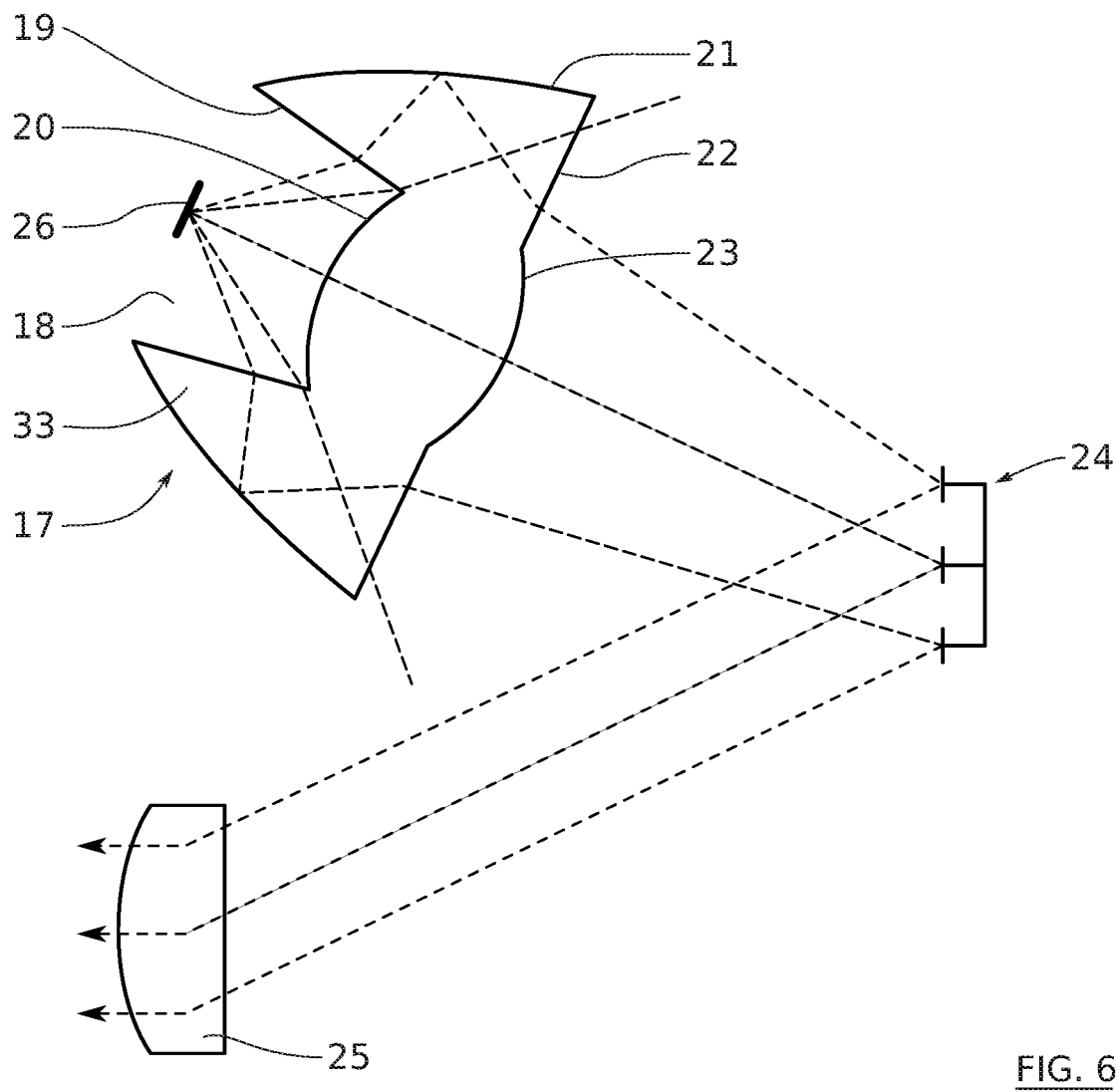
FIG. 6 shows a schematic section view of a module of the invention in a non-limiting example.

FIG. 6 shows an embodiment of a module of the invention incorporating such an optical device 17.

In the upstream to downstream direction following the path of the light rays, the presence of a light source 26 is noted, which can be of the type previously indicated. Preferably, the light source 26 is configured to emit in a half-space from a rectangular shaped emissive zone. FIG. 6 provides the long dimension of the rectangular shape, with the narrow dimension being perpendicularly located. At least one part of the rays emitted by the source 26 is optically processed by an optical device 17. This processing will be described in greater detail hereafter. At the output of the optical device 17, at least part of the processed rays impacts the surface of the pixelated and digital imaging system, in this case a matrix 24 of micro-mirrors. Preferably, the impact surface defined by all the micro-mirrors is rectangular shaped, with a long dimension corresponding to that shown in FIG. 6 and a perpendicular narrow dimension. Preferably, the rectangular shapes of the source 26 and of the impact surface are identical or at the very least homothetic. In this way, the adaptation to be performed by the optical device 17 is facilitated, with an aspect identity or aspect ratio being present between the source and the desired projection.

According to the orientation of the mirrors, the rays are reflected either so as to participate in the projected beam or so as to be inactive. It is in this way that the configuration of the pixelated beam can be freely controlled. In the case shown, the active rays are directed towards an optical projection element 25, which typically is a projection lens.

Figure 8:
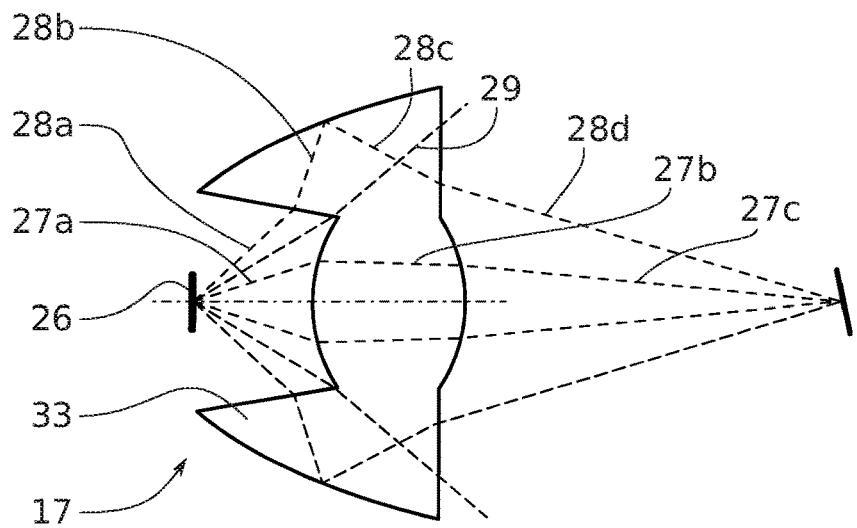
FIG. 8 shows the path of the light rays through the optical device in one embodiment.
Figure 9:
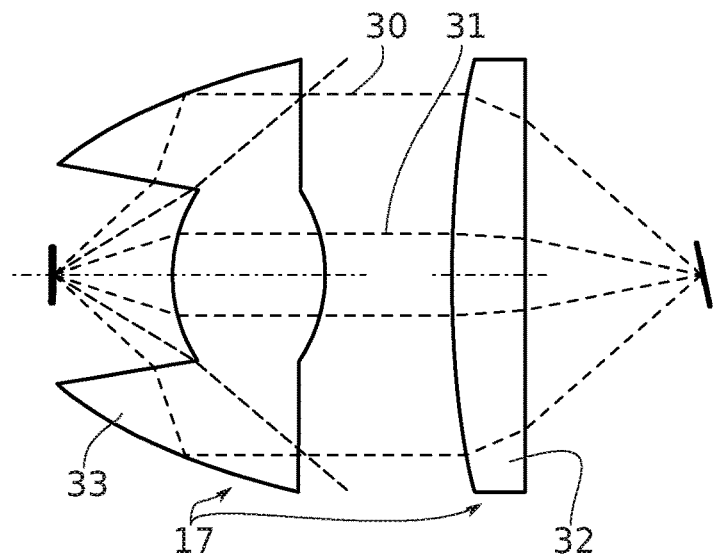
FIG. 9 shows the path of the light rays through the optical device in another embodiment; the same applies to FIG. 10.
Figure 10:
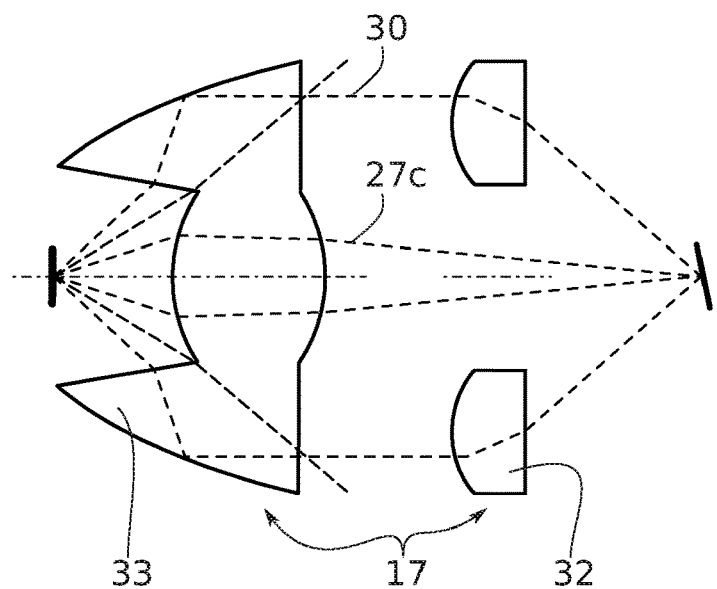

In order to modify the spatial distribution of the light beams originating from the light source 26, the optical device 17 comprises a first portion, in which some rays of the light source 26 will be processed in order to produce the first spatial distribution, and a second portion, in which other rays of the light source 26 will be processed in order to produce the second spatial distribution. In this sense, the optical device 17 shown in the embodiment of FIG. 6 comprises an optical block 33 with different regions. Preferably, the optical block 33 is an integrally formed unitary assembly. It can involve a block made of a polymer material, such as polycarbonate. The optical block 33 comprises a central region provided with a cavity 18, opposite which the light source 26 is configured to emit. The light source 26 can be located in the plane of the opening of the cavity 18. The cavity 18 comprises a bottom 20 located directly opposite the light source 26, and a lateral wall 19 connecting the bottom 20 and the opening of the cavity 18. Opposite the zone for placing the light source 26, the optical block 33 comprises an output face 22. Preferably, the region of the optical block 33 located between the bottom 20 and the output face 22 forms a first portion, through which the light rays are optically processed in order to produce the first spatial distribution. In the considered example, the bottom 20 and the output face 22 comprise, in the zone corresponding to the first portion, in this case substantially central in the block, a convex shape. Thus, in this zone, the optical block 33 acts as a lens having an input dioptre, the bottom 20, and an output dioptre, the curved surface 23, and the rays originating from the source 26 are transmitted therein with the conventional effects of refraction. Other rays emitted by the source 26 enter the optical block 33 via the lateral wall 19. Thus, the block 33 comprises a second portion, the input face of which is the lateral wall 19 and which is substantially located on the periphery of the first portion defined by the bottom 20, the optical processing of the rays being different in the second portion in relation to the first portion. In this second portion, they advantageously undergo a reflection. According to a first embodiment, the optical block 33 comprises a reflective surface, on which the rays undergo the reflection. It can involve a reflective coating in the vicinity of the external wall 21 of the block 33 outside the output face 22 and the cavity 18. According to another embodiment, the refraction indices are adjusted so as to produce a total internal transmission of the rays through this second portion of the block 33. FIGS. 8 to 10 provide more specific examples of the light paths in the optical device 17.

Figure 7:
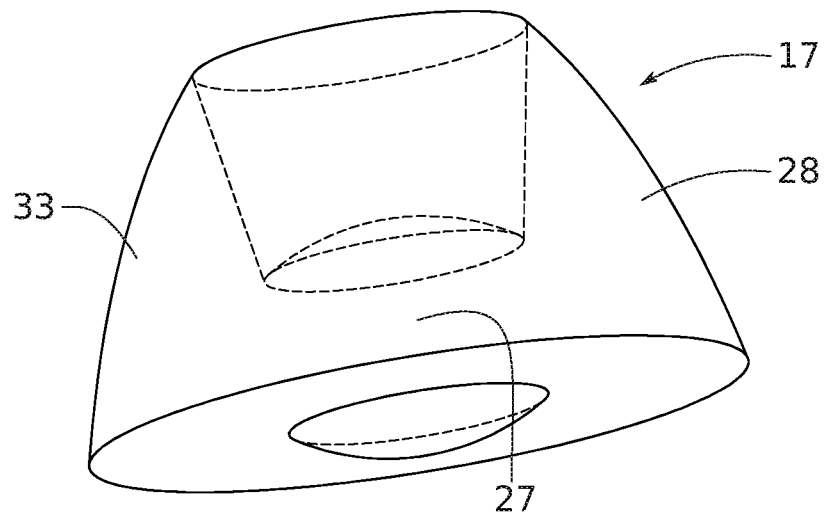
FIG. 7 shows a perspective view of an optical block that can be used in the optical device of the module.

FIG. 7 shows a perspective view of the optical block 33 of the embodiment of FIG. 6. It can be noted that, advantageously, the block 33 exhibits rotational symmetry. Advantageously, the bottom 20 is centred on the axis of symmetry. There is a zone 27, in the vicinity of which the light transmission occurs, and a zone 28, in the vicinity of which the light reflection occurs.

FIG. 8 shows a detailed view of some light rays, the route of which is described hereafter. A ray 27*a* originating from the source 26 enters the transmission zone 27 of the optical device 17 via an input dioptre formed by the bottom 20 of the cavity 18. The refraction induced by the change of environment modifies the incline of the ray and produces a refracted ray 27*b* up to the output face 22. It is understood that the shape afforded to the input and output dioptres of the transmission zone 27 allows the spatial distribution of the rays to be regulated according to a first distribution in this part. For example, this can occur with the operation of a lens, for example, a biconvex lens, as in the example, producing a concentration of beams of a determined type. At the output, a ray 27*c* is directed towards the reflective surface of a mirror of the matrix of micro-mirrors forming, in this example, the pixelated and digital imaging system.

Another ray 28*a* originating from the source impacts the lateral wall 19 of the optical block 33 of the device 17. The change of environment produces a refracted ray 28*b*, which is directed towards the external wall 21 of the block 33. At this level, it is reflected in the form of a ray 28*c* up to the output face of the block 33. The exiting beam 28*d* is directed towards a mirror of the matrix of micro-mirrors according to a second distribution of light. For example, the distribution of light corresponding to the reflected rays can be more concentrated and, for example, can correspond to the distribution shown in FIG. 4. For example, the distribution of light produced by the transmission zone of the optical device can be more homogeneous and can correspond to the distribution shown in FIG. 3. It is to be noted that some rays, such as the ray 29, can be lost.

Since these distributions of light are simultaneous, it is possible to obtain, for example, the final distribution corresponding to that of FIG. 5. The same differential distribution of light is found on the pixelated beam projected in front of the vehicle. It is understood that, in this general beam, the module can be freely controlled to activate or deactivate all or part of the pixels of the pixelated beam.

In the case of FIG. 8, the optical device 17 is a single part. Obviously, this solution by no means limits the invention. Furthermore, FIG. 9 provides an alternative solution, in which the optical block 33 is associated with an additional element 32 so as to form the assembly of the device 17. In this example, the block 33 produces, as before, a transmission with refraction of some rays and a transmission with reflection of other rays, according to different spatial distributions. At the output, the rays are collimated, thus corresponding to the rays 30 and 31 of FIG. 9. The additional optical element 32 is used to converge the rays towards the matrix of micro-mirrors. It can involve a lens, for which the curvatures of the input and output dioptres are adapted to the desired convergence.

FIG. 10 shows another variation, in which the optical device 17 is in a plurality of parts. This time, the optical block 33 produces, in the reflection zone, collimated rays 30, which are then concentrated by the additional optical element 32. However, the first portion of the optical block 33, functioning by transmission with simple refraction, provides rays 27*c* as output that are directly concentrated towards the matrix of micro-mirrors.

It is to be noted that the preceding examples allow the generation of two different simultaneous distributions of the light originating from the source 26. It is not inconceivable that more than two distributions are formed by virtue of the invention, for example, to produce an additional point of light concentration. In general, the plurality of optical distributions is produced by a plurality of reflective and refractive optical modes.

The invention is not limited to the embodiments described but extends to any embodiment according to the spirit of the invention.

REFERENCES

1. Vehicle
2. Low beam base beam
3. Pictograms zone
4. High beam base beam
5. Output beam
6. Line of horizon
7. Optical axis
8. Vertical line
9. Light concentration zone
10. Cut-off edge
11. Kinked part
12. Projection contour
13. Illumination variation zone
14. Homogeneous illumination zone
15. Illumination variation zone
16. Zone of maximum light concentration
17. Optical device 18. Cavity
19. Lateral wall
20. Bottom
21. External wall
22. Output face
23. Curved surface
24. Matrix of micro-mirrors
25. Optical projection element
26. Light source
27. Transmission zone
27a Ray originating from the source
27b Refracted ray
27c Exiting ray
28. Reflection zone
28a Ray originating from the source
28b Refracted ray
28c Reflected ray
28d Exiting ray
29. Lost ray
30. Collimated rays
31. Collimated rays
32. Additional optical element
33. Optical block

The invention claimed is:

1. A light module for a motor vehicle configured to produce an output beam, comprising:
a light source;
a pixelated and digital imaging system; and
an optical device that is interposed, following the path of the light rays originating from the light source, between the light source and the pixelated and digital imaging system so as to transmit at least part of the light rays originating from the light source to an impact surface of the pixelated and digital imaging surface,
wherein the optical device includes:
a first portion configured to optically process a first part of the light rays originating from the light source, and
a second portion configured to optically process a second part, different from the first part, of the light rays originating from the light source,
wherein the first portion is configured to produce a first output beam having a first spatial distribution of light on the impact surface of the pixelated and digital imaging surface, and the second portion is configured to produce a second output beam having a second spatial distribution of light, different from the first spatial distribution of light, on the impact surface of the pixelated and digital imaging surface, wherein the optical device comprises an optical block comprising an input dioptre for the rays originating from the light source and at least one additional optical element separated from the optical block, a center axis of the optical block being aligned with a center portion of the impact surface of the pixelated and digital imaging surface and angled at a non-zero angle relative to the impact surface of the pixelated and digital imaging surface,
wherein the first spatial distribution of light on the impact surface of the pixelated and digital imaging surface is a homogeneous spatial distribution, the second spatial distribution of light on the impact surface of the pixelated and digital imaging surface is an inhomogeneous spatial distribution, and the first and second spatial distributions of light overlap such that a portion of the impact surface of the pixelated and digital imaging surface includes only the homogeneous spatial distribution of light, wherein the second portion of the optical device is configured to reflect light rays towards an output diopter and the first portion of the optical device is configured to transmit light rays towards the output dioptre without reflecting said light rays.

2. The light module according to claim 1, wherein the first spatial distribution of light on the pixelated and digital imaging surface has a homogeneous light intensity in a closed contour zone centered on the impact surface of the pixelated and digital imaging surface, and the first spatial distribution of light on the pixelated and digital imaging surface covers at least 50% of the impact surface of the pixelated and digital imaging surface.

3. The light module according to claim 1, wherein the second spatial distribution of light on the pixelated and digital imaging surface has an increasing light intensity up to a zone of maximum light concentration.

4. The light module according to claim 3, wherein the zone of maximum light concentration includes a center of the impact surface of the pixelated and digital imaging surface.

5. The light module according to claim 3, wherein the light intensity in the zone of maximum light concentration is greater than a maximum light intensity of the first spatial distribution of light on the pixelated and digital imaging surface.

6. The light module according to claim 1,
wherein a first face of the optical block forms the input dioptre, the optical block being provided with a cavity comprising a bottom and a lateral wall,
wherein the optical device includes a second face, opposite the first face, forming the output dioptre for light rays, and
wherein the optical block is configured to reflect at least part of the rays entering the optical block via the lateral wall towards the second face and to transmit at least part of the rays entering the optical block via the bottom towards the second face.

7. The light module according to claim 6, wherein the optical block is configured to reflect at least part of the rays entering the optical block via the lateral wall towards the second face by total internal reflection.

8. The light module according to claim 6, wherein the optical block is configured to reflect at least part of the rays entering the optical block via the lateral wall towards the second face by reflecting on a reflective surface of the external wall of the optical block.

9. The light module according to claim 6, wherein the optical block is an integrally formed single part.

10. The light module according to claim 1, wherein the optical block is configured to collimate at least part of the rays upon exiting and the additional optical element is configured to concentrate the collimated rays.

11. The light module according to claim 1, wherein the pixelated and digital imaging system comprises a matrix of micro-mirrors.

12. The light module according to claim 1, wherein the light source comprises a rectangular shaped light emission face provided with at least one light-emitting diode.

13. The light module according to claim 12, wherein the light emission face is a homothety of the impact surface.

14. The light module according to claim 12, wherein the first portion and the second portion are configured to produce an anamorphosis between the emission face and the impact surface.

15. The light module according to claim 1, wherein the output beam is configured to project at least one pictogram pattern.

16. A lighting and/or signalling device for a motor vehicle equipped with at least one said light module according to claim 1.

17. The lighting and/or signalling device according to claim 16, comprising at least one additional said light module comprising at least one from among an additional module configured to produce a low beam base beam and an additional module configured to produce a high beam base beam.

18. The lighting and/or signalling device according to claim 17, comprising an additional module configured to produce a low beam base beam and an additional module configured to produce a high beam base beam, wherein the output beam of the module partly overlaps both the high beam base beam and the low beam base beam.

19. The lighting and/or signaling device according to claim 16, further comprising:
an additional module configured to produce a low beam base beam; and
an additional module configured to produce a high beam base beam, wherein:
the first spatial distribution of light on the pixelated and digital imaging surface has a homogeneous light intensity in a closed contour zone,
the second spatial distribution of light on the pixelated and digital imaging surface has an increasing light intensity up to a zone of maximum light concentration, and
the zone of maximum light concentration corresponds to a location of maximum illumination of a full beam including the low beam base beam and the high beam base beam.

20. The light module according to claim 1,
wherein the first spatial distribution of light on the pixelated and digital imaging surface has a homogeneous light intensity in a closed contour zone,
wherein the second spatial distribution of light on the pixelated and digital imaging surface has an increasing light intensity up to a zone of maximum light concentration,
wherein the light intensity in the zone of maximum light concentration is greater than a maximum light intensity of the first spatial distribution of light on the pixelated and digital imaging surface, and
wherein the first and second spatial distributions of light form a composite spatial distribution of light on the impact surface of the pixelated and digital imaging surface such that part of the first spatial distribution of light on the impact surface of the pixelated and digital imaging surface overlaps part of the second spatial distribution of light on the pixelated and digital imaging surface.

21. A light module for a motor vehicle configured to produce an output beam, comprising:
a light source;
a pixelated and digital imaging system; and
an optical device that is interposed, following the path of the light rays originating from the light source, between the light source and the pixelated and digital imaging system so as to transmit at least part of the light rays originating from the light source to an impact surface of the pixelated and digital imaging surface,
wherein the optical device includes:
a first portion configured to optically process a first part of the light rays originating from the light source, and
a second portion configured to optically process a second part, different from the first part, of the light rays originating from the light source,
wherein the first portion is configured to produce a first output beam having a first spatial distribution of light on the impact surface of the pixelated and digital imaging surface, and the second portion is configured to produce a second output beam having a second spatial distribution of light, different from the first spatial distribution of light, on the impact surface of the pixelated and digital imaging surface,
wherein the optical device comprises an optical block comprising an input dioptre for the rays originating from the light source, and at least one additional optical element separated from the optical block, a center axis of the optical block being aligned with a center portion of the impact surface of the pixelated and digital imaging surface and angled at a non-zero angle relative to the impact surface of the pixelated and digital imaging surface,
wherein the second portion of the optical device is configured to reflect light rays towards an output dioptre,
wherein the first portion of the optical device is configured to transmit light rays towards the output dioptre without reflecting said light rays,
wherein a first face of the optical block forms the input dioptre, the optical block being provided with a cavity comprising a bottom and a lateral wall,
wherein the optical device includes a second face, opposite the first face, forming the output dioptre for light rays,
wherein the optical block is configured to reflect at least part of the rays entering the optical block via the lateral wall towards the second face and to transmit at least part of the rays entering the optical block via the bottom towards the second face,
wherein the at least one additional optical element is configured to refract the second output beam without processing the first output beam,
wherein the first spatial distribution of light on the pixelated and digital imaging surface has a homogeneous light intensity in a closed contour zone,
wherein the second spatial distribution of light on the pixelated and digital imaging surface has an increasing light intensity up to a zone of maximum light concentration,
wherein the light intensity in the zone of maximum light concentration is greater than a maximum light intensity of the first spatial distribution of light on the pixelated and digital imaging surface, and
wherein the first and second spatial distributions of light form a composite spatial distribution of light on the impact surface of the pixelated and digital imaging surface such that part of the first spatial distribution of light on the impact surface of the pixelated and digital imaging surface overlaps part of the second spatial distribution of light on the pixelated and digital imaging surface.

* * * * *